March 2, 1965  A. E. BADGER ETAL  3,171,771
GLASS TO METAL SEAL
Filed Jan. 12, 1959

INVENTORS
Alfred E. Badger and
BY Warren R. Kowalka
Nobbe & Swope
ATTORNEYS

United States Patent Office 3,171,771
Patented Mar. 2, 1965

3,171,771
GLASS TO METAL SEAL
Alfred E. Badger, Maumee, and Warren R. Kowalka, Rossford, Ohio, assignors to Libbey-Owens-Ford Glass Company, Toledo, Ohio, a corporation of Ohio
Filed Jan. 12, 1959, Ser. No. 786,215
7 Claims. (Cl. 161—44)

The invention is concerned with a novel method of sealing glass to metal.

According to one conventional method of sealing glass to metal the glass is melted and then brought into contact with the metal so that on setting up of the fused glass a relatively strong adhesion between the glass and metal is achieved. However, because of the inherently large difference in thermal expansion characteristics between ordinary glasses and the common metals there are developed within the seal correspondingly large mechanical stresses after the seal has cooled to room temperature. For example, if an ordinary soda-lime-silica glass, e.g., percent by weight $SiO_2$—72.0, $CaO$—11.2, $MgO$—2.1, $Na_2O$—13.8, other—0.9, with a thermal expansion coefficient of about $90 \times 10^{-7}$ per ° C. is sealed to a copper or aluminum object having expansion coefficients of about $14.09 \times 10^{-6}$ and $25.5 \times 10^{-6}$ per ° C. by the above-described fusing technique a substantial temperature change of the metal and glass causes a working of the glass closely adjacent the metal surface which will result in a breaking or separating thereof.

Heretofore it has been proposed to overcome this type of breakage by varying the composition of the glass in order to produce a modified glass having a thermal coefficient of expansion closely aproximating that of the metal to which the glass is to be sealed. However, it has been found that changing the composition of the glass in this manner has the undesirable effect of also changing other properties of the glass such as chemical durability, hardness and resistance to abrasion, and in fact, the change in these other characteristics may be of such a magnitude as to preclude the use of the modified glass for the intended purpose even though its thermal expansion characteristics are completely satisfactory.

Another solution that has been proposed to overcome this problem is to reduce the mass of the metal adjacent the portion of the glass to which it is to be sealed so that on temperature variations of the different parts the relative difference in expansions is small. For obvious reasons, however, this can be practically achieved in only a small number of cases.

It is therefore, the primary object of the present invention to provide an effective and universally applicable method of permanently sealing glass to metal.

Briefly, the invention contemplates the improved joining of glass to metal bodies by the provision of a flexible bridge type seal.

In the drawings wherein like numerals are employed to designate like parts throughout the same:

Figure 1:
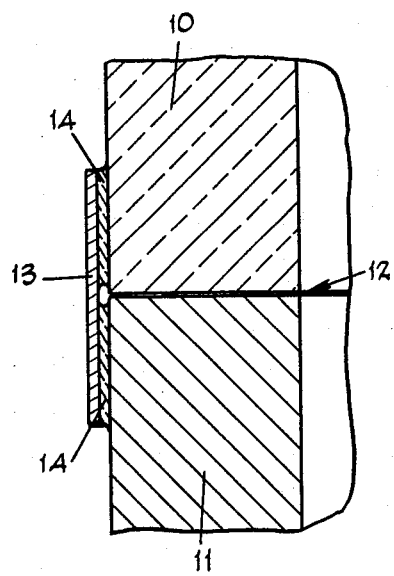
FIG. 1 is a fragmentary sectional view through one form of glass to metal seal embodying the present invention.

Referring now to the drawings there is shown in FIG. 1 a glass body 10 and a metal body 11 to be sealed together and which are disposed in aligned but separated relation from one another by a space 12. The novel flexible bridge type seal of the invention as shown here is provided by securing a relatively thin strip 13 of metal to surfaces of the glass and metal adjacent the space 12 with the strip bridging the space. The strip 13 is secured to bodies 10 and 11 by interposing a fused mass of low melting glass therebetween which on setting up forms an adhesive layer 14 tightly sealing the metal strip over the gap 12.

The securing of the strip to the glass and metal bodies is preferably accomplished by placing a layer of low-melting glass powder between the strip and each of the bodies and applying a flame to the exposed surface of the strip until the glass layer is thoroughly fused. Although this is the preferred way it is not meant to preclude other methods of accomplishment. For example, the powdered low-melting glass may be disposed on the metal strip in two layers and fused thereon, and the composite strip then fused as a unit to the glass and metal bodies.

The metallic strip 13, because of its relatively thin nature is sufficiently flexible to compensate for any stresses in the finished seal sufficient to rupture the seal. Although the thickness of this metal strip cannot be specified with any precision, it should be as thin as possible and yet thick enough to provide a seal capable of withstanding normal usage. As an example, satisfactory metal strips for sealing the metal to glass have been produced from sheets of aluminum and copper having a thickness of 1 to 3 mils. However, tests indicate that 5 mils is the probable maximum thickness of such a strip with which a good sealing relationship can be obtained. In addition although the use of aluminum and copper for the sealing strip has proved very satisfactory other metals or alloys may also be used.

It is preferable that the sealing layer 14 be composed of a low-melting glass or ceramic material having a fusion temperature lower than that of the metal strip 13. This insures that during the sealing process, the strip itself will not be either partially or completely fused to destroy or materially impair its sealing properties. It is also important that the low-melting glass have a lower softening temperature than that of the glass to be sealed, in order to prevent distortion of the latter. As to the expansion coefficient of the low melting glass it does not have to be confined within rigid limits. For example, a number of samples have been made in which the glass comprising the low melting layer 14 has a thermal coefficient of expansion differing from that of the glass of the body 10 by more than $30 \times 10^{-7}$ per degree C. with excellent results.

Low melting glasses or enamels suitable for use in the present invention may be obtained commercially from the E. I. du Pont de Nemours & Co. (Inc.) and the Harshaw Chemical Company among others.

Figure 2:
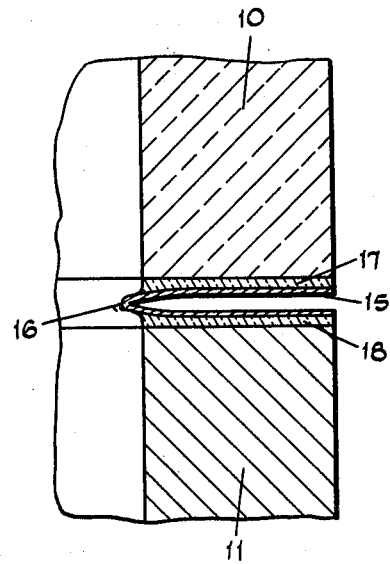
FIG. 2 is a similar view illustrating another embodiment of the invention.

In some circumstances it may be important that the sealing structure does not extend onto face surface portions of the bodies being sealed together. This can be accomplished readily by another embodiment of the invention shown best in FIG. 2. According to this embodiment a metal strip 15, folded across itself along a fold line 16 so as to form a substantially V-shape in cross-section, has the outer surfaces of the V sealed to the edges of the glass and metal bodies 10 and 11 by means of two low melting glass layers 17 and 18. It is to be noted that in this modification it is preferable that the fold line 16 be kept free of the low-melting glass of layers 17 and 18 so that flexure may take place along the line and thus relieve any stresses that may be set up.

Figure 4:
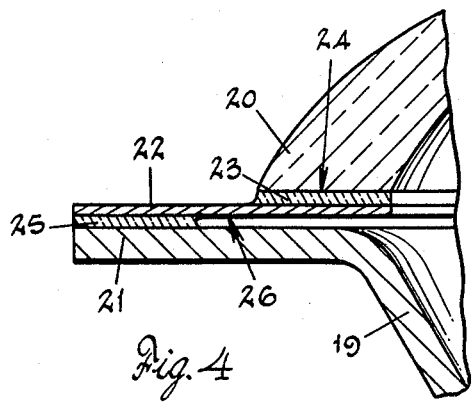
FIG. 4 is a sectional view taken substantially along the line 4—4 in FIG. 3.
Figure 5:
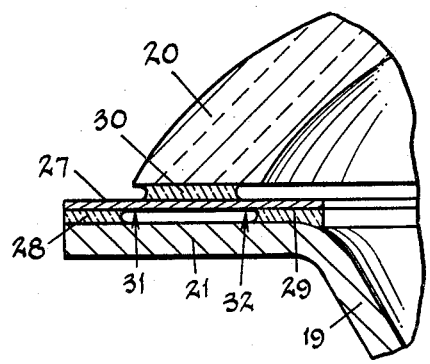
FIG. 5 is a similar sectional view showing another embodiment of the invention.
Figure 3:
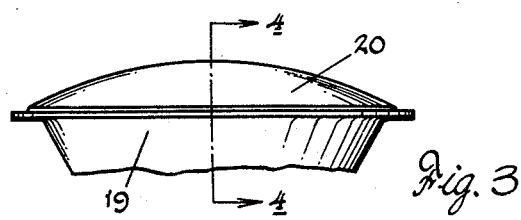
FIG. 3 is a fragmentary view of the outer end of a conventional television picture tube embodying a glass-metal seal according to the invention.

FIGS. 3, 4 and 5 are concerned with the application of the invention to solve a unique problem encountered in the manufacture of cathode ray or "picture" tubes in television sets. These tubes generally comprise a metal portion 19 having an enlarged open end with a curved glass viewing portion 20 sealed onto the open end as is shown best in FIG. 3. Because of the relatively large size of such tubes and the low internal pressures at which they are maintained the provision of a suitable seal between the metal cone 19 and the glass viewing portion 20 is an especially difficult thing to achieve.

Referring particularly to FIG. 4 there is shown a cross section of the metal portion 19 having an outwardly extending flange 21 to which the viewing glass 20 is to be sealed. A thin metal strip 22 is provided of such dimension that when disposed over the upper portions of the flange 21 it will cover a substantial portion of the surface area of the flange and extend continuously therearound. The strip 22 is sealed to the viewing glass 20 by interposing a layer 23 of a fused low melting ceramic material of the type described hereinabove between the mounting edge 24 of the viewing glass 20 and the strip. Heat is then applied to the strip so as to fuse the ceramic material to the strip and the glass. It is to be noted that when this ring-shaped or annular strip is sealed to the viewing glass at this time a portion of the strip extends beyond the outer extremity of the viewing glass. Finally, the outer portion of the ring strip extending beyond the glass edge is then secured to the metal flange 21 by placing a second layer 25 of a low-melting ceramic between the strip and the flange and heating it to fusion as before.

With the seal between the viewing glass and the metal portion of the tube completed there will be provided a portion 26 of the ring strip which is free from direct contact with the low-melting glass of either of the layers 24 or 25. This portion 26 provides flexibility to the seal and permits the taking up of any internal stresses in the seal by flexing of the metal rather than a rupturing of the seal.

A modification of the seal of FIG. 4 which has been found to give satisfactory results is that illustrated in FIG. 5. In order to practice the invention of this embodiment it is necessary that the metal portion 19 and the viewing glass 20 be of such dimensions relative to one another that when the glass is in position over the large end of the cone the mounting edge of the glass will be disposed approximately at the midpoint of the flange 21. In this embodiment a metal strip 27 is first secured to the flange 21 by placing two spaced continuous layers 28 and 29 of low-melting glass and fusing to the strip through the application of heat thereon. Next a third continuous layer 30 of low-melting glass material is placed on the upper surface of the strip 27 and fused to the glass 20 by applying heat onto glass being careful not to break the seal of the already fused layer 28. It is to be noted that in this embodiment two portions 31 and 32 of the strip 27 are free from contact with any of the low melting glass layers. Thus, there is afforded in this embodiment an even greater opportunity for relieving stresses within the sealed parts and the seal itself through the flexing of the metallic strip in two areas.

Therefore, according to the invention strong, flexible gas-tight seals or "bridges" can be provided between glass and metal bodies of any mass.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:
1. A glass-metal article, comprising a major glass portion and a major metal portion spaced from one another and having different coefficients of expansion, a thin metal strip of a thickness in the range of 1 to 5 mils extending between said glass and said metal portions, a first layer of low-melting glass sealing said glass portion to said metal strip, and a second layer of a low-melting glass spaced from said first layer and sealing said metal portion to said strip.

2. A glass-metal article according to claim 1, wherein said layers of low-melting glass are located on opposite sides of said strip.

3. A sealing structure for joining a meal body to a glass body spaced therefrom along their facing surfaces, comprising a thin metal strip folded across itself to provide a pair of outwardly extending surfaces, a first low-melting glass body in fusion contact with one of the outwardly extending surfaces of the strip and the facing surface of said glass body, and a second low-melting glass body fused to the other outwardly extending surface of the strip and the facing surface of said metal body with the area of the strip immediately adjacent the fold line being free from contact with the low-melting glass bodies.

4. A structure for hermetically sealing a glass cover to an open-ended flanged metal shell, comprising an unbroken thin metal strip having substantially the same area as the flange and substantially coincident therewith, a pair of continuous low-melting glass layers spaced from one another fused to the flange and one surface of said strip, and a third continuous low-melting glass body fused to the glass cover and areas of the other surface of the strip disposed between the pair of glass bodies.

5. A glass-metal article, comprising a glass portion and a metal portion, said metal portion being open-ended and flanged adjacent such open end, an endless thin metal strip having a thickness in the range of approximately 1 to 5 mils, a first continuous layer of low-melting glass fused to said flange and to a portion of one surface of the thin metal strip providing an uninterrupted seal therebetween, and a second continuous layer of low-melting glass fused to the other surface of the thin metal strip opposite portions of the flange other than those contacting said first low-melting glass layer, said second low-melting glass layer being in fused contact with said glass portion.

6. A method of sealing a metal body to a glass body spaced therefrom each having surfaces facing one another, comprising folding a strip of metal onto itself to provide a pair of outwardly extending surfaces, placing a layer of low-melting glass on the facing surfaces of the metal and glass bodies, interposing said bent metal strip between the facing surfaces with the outwardly extending surfaces of said strip arranged in opposed relation to said facing surfaces and in contact with the low-melting glass layers, and heating the low-melting glass layers to fuse the same to the facing surfaces and the outwardly extending surfaces of the metal strip while leaving areas of the strip immediately adjacent the line of fold free from contact with low-melting glass.

7. A method of hermetically sealing a glass cover to an open-ended metal shell provided with a flange on said open-end, which comprises placing a pair of continuous layers of low-melting glass powder on the flange and spaced a substantial distance from one another, locating a continuous thin metal strip of dimensions substantially the same as said flange onto said flange in contact with said layers, placing a third continuous layer of low-melting glass on the exposed surface of the thin metal strip between the first two low-melting glass layers, locating the glass cover in uninterrupted contact with said third layer, and heating said low-melting glass layers to fuse them to the respective bodies and the metal strip.

References Cited in the file of this patent

UNITED STATES PATENTS

| | | |
|---|---|---|
| 2,296,307 | Power | Sept. 22, 1942 |
| 2,708,774 | Seelen | May 24, 1955 |
| 2,749,668 | Chaffotte et al. | June 12, 1956 |
| 2,768,475 | Seelen et al. | Oct. 30, 1956 |
| 2,837,235 | Vincent | June 3, 1958 |
| 2,920,785 | Veres | Jan. 12, 1960 |
| 2,936,924 | Blanding | May 17, 1960 |
| 2,969,163 | Roberts | Jan. 24, 1961 |